United States Patent
Peuhu et al.

(12)
(10) Patent No.: US 6,311,076 B1
(45) Date of Patent: Oct. 30, 2001

(54) MOBILE COMMUNICATION DEVICES

(75) Inventors: Arto Peuhu; Mika Isotalo, both of Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/023,277

(22) Filed: Feb. 13, 1998

(30) Foreign Application Priority Data

Feb. 21, 1997 (FI) .......................................... 970755

(51) Int. Cl.⁷ ...................................................... H04B 1/38
(52) U.S. Cl. ............................................. 455/566; 455/575
(58) Field of Search ..................................... 455/550, 566, 455/575, 90; 379/428, 430, 433, 434; 345/155, 156, 157

(56) References Cited

U.S. PATENT DOCUMENTS

| 4,948,232 | 8/1990 | Lange | 350/334 |
|---|---|---|---|
| 5,016,002 | 5/1991 | Levanto | 340/756 |
| 5,175,759 | * 12/1992 | Mefroka et al. | 455/575 |
| 5,260,998 | * 11/1993 | Takagi | 379/433 |
| 5,584,054 | * 12/1996 | Tyneski et al. | 455/575 |
| 6,067,074 | * 5/2000 | Lueders | 345/156 |

OTHER PUBLICATIONS

"Electrophoretic Ink: A Printable Display Material", Comiskey et al., Society for Information Display, May 1997 Digest, pp. 75–76, (ISSN0097–0966X/97/2801–0075).

* cited by examiner

Primary Examiner—Thanh Cong Le
(74) Attorney, Agent, or Firm—Perman & Green, LLP

(57) ABSTRACT

A mobile communication device has a housing 1 containing battery and electronic component compartments 7. Located along a central axis of the housing 1 is a spring mounted roller 4 to which is attached a flexible liquid crystal display 9. The housing 1 contains a compartment between the roller 4 and the outer wall of the housing 1 for storing the display 9 in a retracted position. An elongate slot 12 extends axially along the housing 1 such that the display 9 can be pulled through the slot 12 by a user to a withdrawn position in which the display 9 is visible to the user.

16 Claims, 4 Drawing Sheets

MOBILE COMMUNICATION DEVICES

FIELD OF THE INVENTION

The present invention relates to mobile communication devices and more particularly, though not necessarily, to mobile telephones.

BACKGROUND OF THE INVENTION

Mobile telephones are becoming increasingly popular due in part to the dramatic miniaturisation of mobile telephones which has occurred over the past decade. However, there remains a desire to further miniaturise mobile telephones whilst also including additional features, e.g. increased memory. A limitation on the scale of miniaturisation which can be achieved is the necessity to provide an electronic display which is large enough to provide information (e.g. alphanumeric characters and icons) to the telephone user. The need for displays also significantly affects the weight and design of mobile phones. Typically, phone displays are conventional liquid crystal displays (LCD) which may occupy up to 25% of the front surface area of the telephone.

It is an object of the present invention to provide a mobile communication device which overcomes or at least mitigates certain of the aforementioned disadvantages.

SUMMARY OF THE INVENTION

According to a first aspect of the present invention there is provided a mobile communication device comprising a flexible electronic display and a housing for containing the display, wherein the display is movable between a retracted position within the housing to an in-use position where the display is visible to a user.

The provision of a flexible display may significantly reduce the contribution which the display makes to the size and weight of the device. It also becomes possible to provide a much larger display area than is possible with conventional solid LCD's. Device optimisation may provide for both reduced weight and size and increased display area. The present invention may also give increased flexibility to device design as the design is no longer constrained by bulky and rigid conventional LCD's.

Preferably, the flexible electronic display is a flexible liquid crystal display.

Preferably, the display is coupled via a spring mounting to the housing, wherein the display can be withdrawn from the housing against the action of the spring mounting and, after withdrawal, the display can be retracted into the housing under the action of the mounting. The mounting may also comprise locking means for locking the display in the in-use position and associated release means. The mounting may comprise switch means, for example associated with the locking means, for electrically activating the display when it is withdrawn from the housing. It will be appreciated that such switch means may provide for reduced power consumption, an important consideration where battery size and life are critical.

The display may be divided, in the direction of withdrawal, into a number of segments each of which is independently powered. The mounting for the display may be arranged such that the display can be withdrawn, and possibly retracted, segment by segment so that only those segments which the user requires to see are visible and powered. This provides for further economy of power consumption.

The display may be provided with one or more touch sensitive elements or 'buttons' which are accessible to the user when the display is withdrawn. It will be appreciated that the provision of these elements may reduce or eliminate the need for mechanical buttons elsewhere on the mobile device and may therefore provide for further economies of size and weight. These elements may be provided directly over active areas, over non-display areas, or over a combination of both. Where the elements are provided over active areas, the display controller may be arranged in use to display in those active areas icons or messages which relate to the function of the element. For elements over non-display areas, permanent legends may be displayed under (if the elements are transparent) or on the elements. Typically, the display may comprise non-active display areas which lie over the routes which the row driver lines for the display are grouped, e.g. along the edges of the display in the direction of withdrawal, in which case these areas may provide suitable locations for touch sensitive elements with associated permanent icons or legends.

Preferably, the housing comprises first and second compartments for containing the retracted display and electronic components of the device respectively. More preferably, the second compartment is substantially contained with the first compartment. For example, the housing may be substantially cylindrical, with the first compartment lying coaxially around the second compartment. Alternatively, the first compartment may be substantially U-shaped with the second compartment being located in the centre thereof.

In order to provide support for the flexible display there may be provided a support member which can be extended from a withdrawn position in which it is contained within or close to the housing to an extended position in which it supports the display. In one embodiment, this support member may also provide an extendible antenna for the device.

The device may have a transparent window provided in the housing and through which an active portion of the display may be viewed.

The present invention is applicable in particular to mobile telephones although it will be appreciated that other mobile communication devices such as pagers and integrated mobile phones and personal digital assistants (PDA) also fall within the scope of the present invention. In the case of mobile phones, the display mounting mechanism may comprise on/off switch means which is activated when the display is withdrawn or retracted and which causes the phone to be switched on or off. In certain circumstances it may be unnecessary for the user to see the display in order to use the phone, e.g. when an incoming call is received, and the phone may therefore comprise additional switch means on the exterior of the housing.

According to a second aspect of the present invention there is provided a mobile telephone comprising a flexible electronic display and a housing for containing the display, the display being movable between a retracted position within the housing to an in-use position where the display is visible to a user, the telephone further comprising switch means actuatable, by movement of the display from the retracted position to the in-use position upon receipt of a telephone call, to take the telephone off-hook.

DETAILED DESCRIPTION

Figure 5:
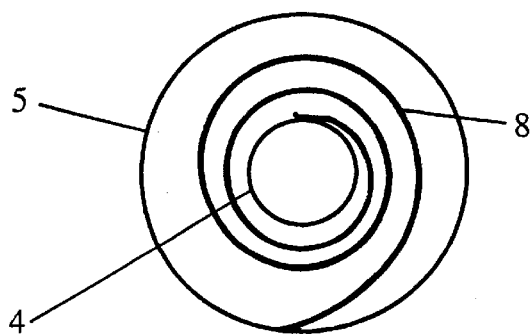
FIG. 5 shows a cross-sectional view through the mounting mechanism of FIG. 4 taken on the line B—B.

A mobile phone is shown schematically in FIGS. 1 to 5 and comprises a circularily cylindrical housing 1 of rigid plastics or the like. An antenna 2 (e.g. telescopic or fixed) and a belt clip 3 are provided in a known manner. In certain cases, the antenna 2 may be internal to the housing 1. The housing 1 contains a cylindrical roller 4 which is mounted coaxially within the housing 1 such that the roller 4 can rotate about the central axis of the housing 1. The mounting for the roller is shown in more detail in FIGS. 4 and 5 and comprises a pair of cylindrical mounts 5 into which respective ends 6 of the roller 4 are located, the ends 6 being rotatable within amounts 5. Projecting ends of the roller are received by locating recesses (not shown in the drawings) provided in the opposing surfaces of adjacent compartments 7, which compartments contain the battery supply for the phone and other electrical components. The mounts are fixed to the opposing cylindrical compartments 7. As is shown in FIG. 5, each mount 5 contains a spirally wound spring 8 which is secured at its outermost end to the inner surface of the mount 5 and at its innermost end to the roller 4.

A flexible rectangular LCD display 9 is electrically and mechanically coupled to the centre of the roller 4 by a short length of ribbon cable 10, the roller 4 and the mounts 5 providing a spring mounting for the display 9. The display 9 is also secured to the mounts 5 in the same axial plane as the coupling to the roller 4 (along regions A and B as shown if FIG. 4). The mounts 5 bias the roller so that, when no external force is applied to the display and the mounts are not locked (see below), the mounts tend to wrap the display 9 around the mounts 5 and the compartments 7. An elongate slot 12 extends axially along the housing 1 and when the display 9 is fully retracted only a small tab 13, fixed to the display, projects through the slot 12. In order to withdraw the display 9, a user must grasp the tab 13 and pull the display 9 through the slot 12 against the action of the mounts 5. A lock 35 is provided for the mounts 5 so that when the display 9 is fully withdrawn automatic retraction is prevented. The lock 35 also prevents the display 9 being damaged due to over withdrawal. The lock 35 is engaged automatically following withdrawal of the display 1 and is released by the user pressing that portion of the lock 35 which projects from the housing 1.

Figure 6:
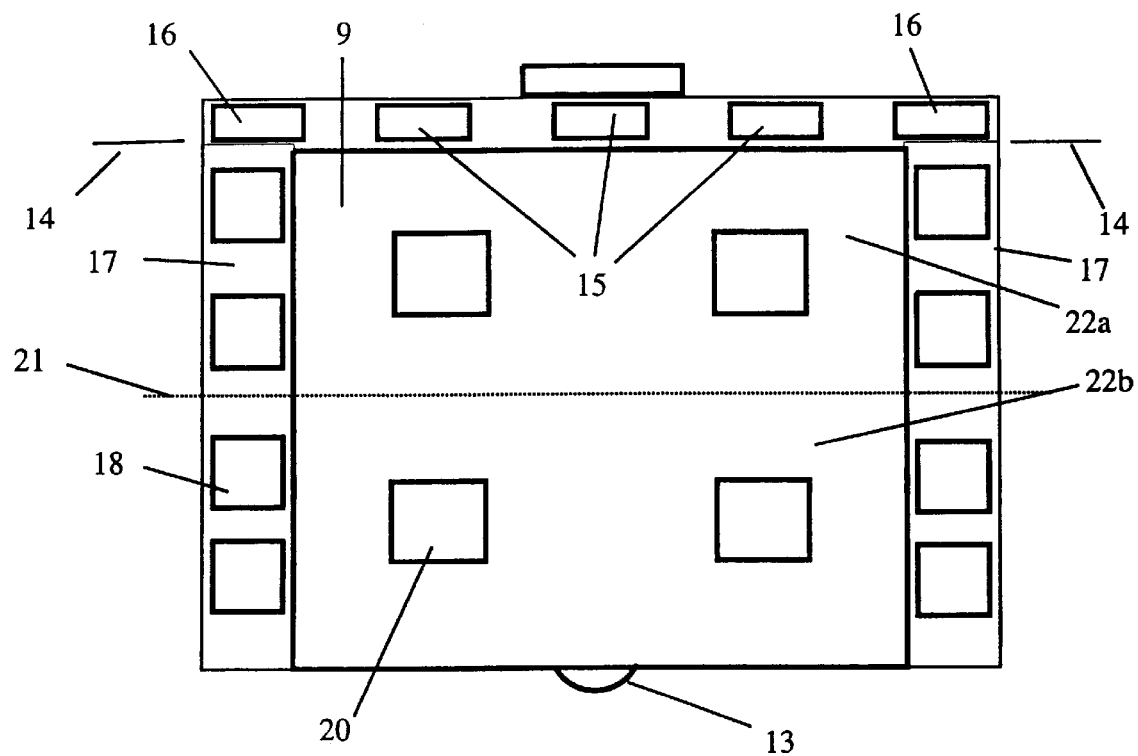
FIG. 6 shows in more detail a display of the phone of FIG. 1.

A flexible LCD suitable for use in the embodiment described here is disclosed for example in U.S. Pat. No. 4,948,232. A typical layout for the display 9 is shown in FIG. 6. That part of the display 9 which is located above the line 14 is always contained within the housing 1 and is the location for the row and column drivers of the LCD pixels. Column drivers 15 are located in the central region of the display 9 whilst the row drivers 16 are located at the two end regions. This arrangement allows the row driver connections to be located along opposing edge regions 17 of the display 9. Whilst these edge regions 17 are unusable as active LCD display areas, permanent icons 18 overlaid with a matrix of transparent touch-sensitive elements (not shown) can be located there. In use, functions indicated by the permanent icons are activated by touching the overlying elements.

The display 9 is coupled to a switch 29 within the housing 1, the switch 29 being switched from an off-condition to an on-condition when the display is withdrawn from the housing 1. In the off-condition, the switch isolates the display 9 from the battery supply whilst in the on-condition power is supplied from the battery supply to turn the display 9 on. When an incoming call is received, withdrawal of the display 9 and the consequent actuation of the switch 29 also causes the phone to be taken 'off-hook'. That is to say that the telephone is activated to enable the user to hear and reply to the caller.

Transparent touch-sensitive elements (not shown) are also overlaid on the active areas of the display 9. In use, icons or text 20 is displayed by the control software under the icons and again functions are activated or information entered by touching these elements.

As is indicated by the dashed line 21 in FIG. 6, the display 9 can be subdivided into a number of segments 22 (is this case two) each of which is backlight independently. The outermost segment 22b may for example be used to display the number of an incoming call or the number of a dialed outgoing call. The mounting for the display 9 may be such that the display lock operates when only the outermost segment 22b is withdrawn from the housing, causing this segment 22b to be backlight. If it is necessary to view the innermost segment 22a, the lock may be released and the display 9 withdrawn further with backlight being supplied to the segments in sequence as they appear. In general, the most used areas of the display 9 are located on the outer segment whilst the least used areas are located in the inner segment.

Figure 1:
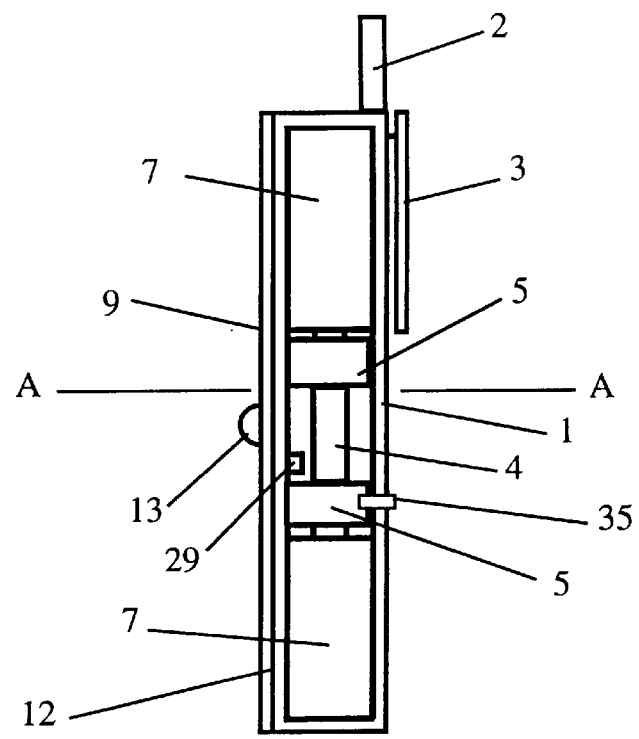
FIG. 1 shows a cross-sectional side view of a mobile phone having a flexible display, with the display in the retracted position.
Figure 2:
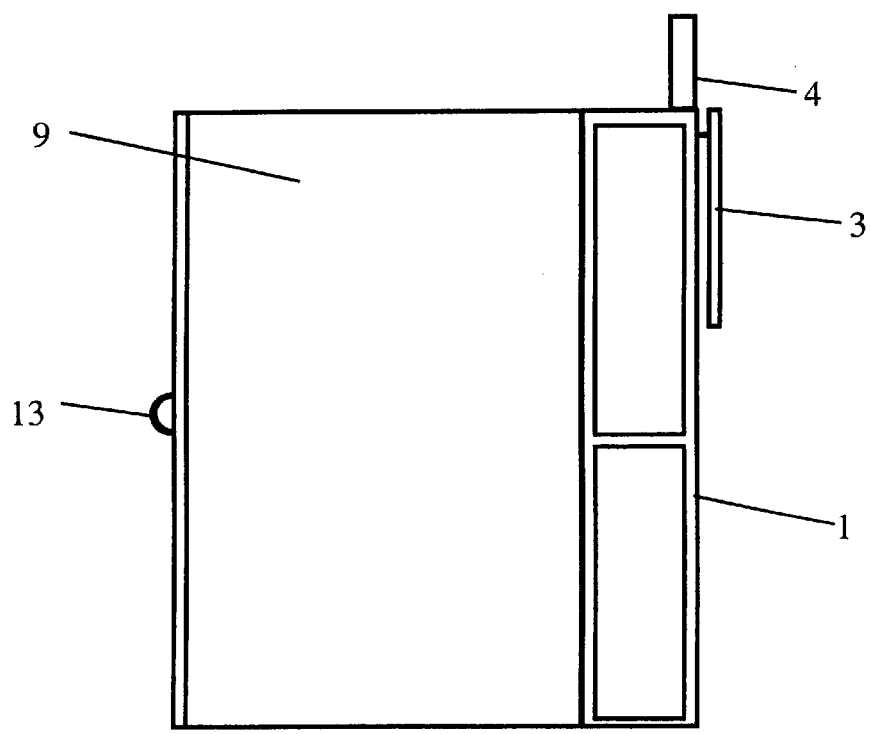
FIG. 2 shows a side view of the phone of FIG. 1 with the display in the withdrawn position.
Figure 3:
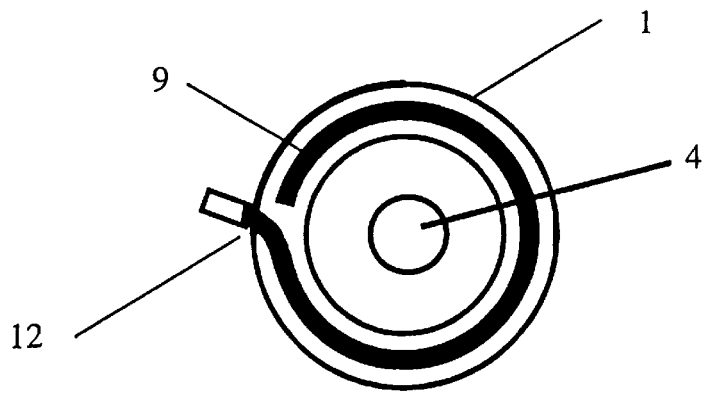
FIG. 3 shows an enlarged cross-sectional view through the phone of FIG. 1 taken on the line A—A.
Figure 4:
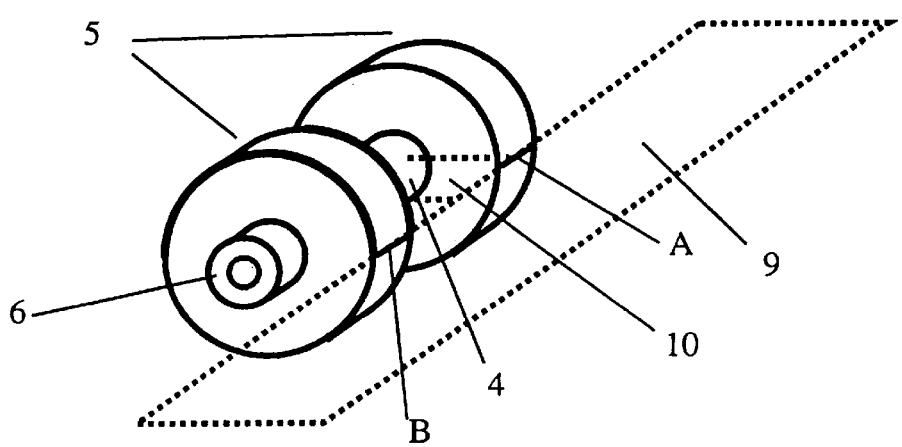
FIG. 4 shows a display mounting mechanism of the phone of FIG. 1.
Figure 7:
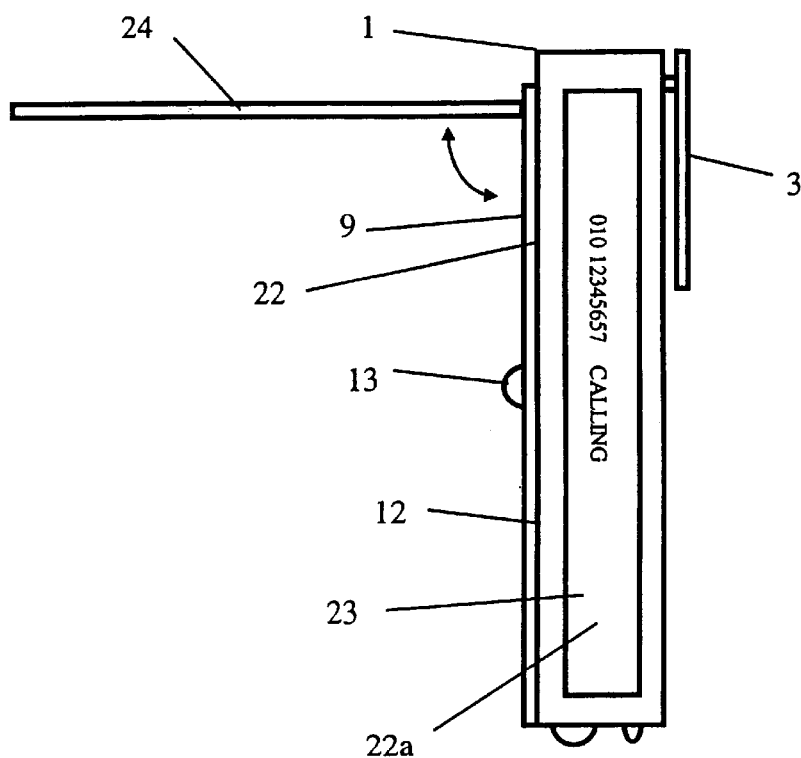
FIG. 7 shows a first modification to the phone of FIG. 1.
Figure 8:
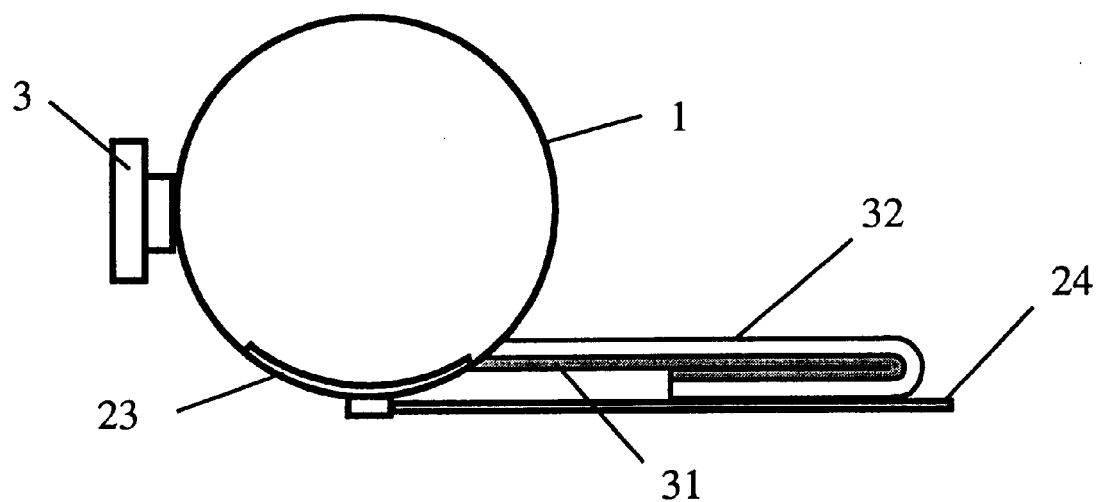
FIG. 8 shows a side view in partial cross-section of the modification of FIG. 7.

FIG. 7 shows a modification to the phone of FIG. 1 and in which the housing 1 is provided with a transparent display window 23, adjacent to the slot 12. This window 23 allows a user to view the outermost segment 22b of the display 9 without having to withdraw it through the slot 12. Additionally, the antenna 2 of the phone of FIG. 1 is replaced by a folding antenna 24 which can be folded (position 'F') against the housing 1 or can be unfolded (position 'U') to provide support for the display 9. FIG. 8 shows a side view of the modified phone of FIG. 7 (with a cross-section taken through the housing only) and in particular shows the double-sided backlighting utilised. The transparent backlighting strip 31 of the display 9 is attached to the inner surface of the flexible LCD portion 32 so that the outermost display segment 22b is backlight from both sides. This allows the outermost segment 22b to be viewed from below (with reference to FIG. 8) through the window 23 when the display 9 is retracted and from above when the display 9 is withdrawn.

Figure 9:
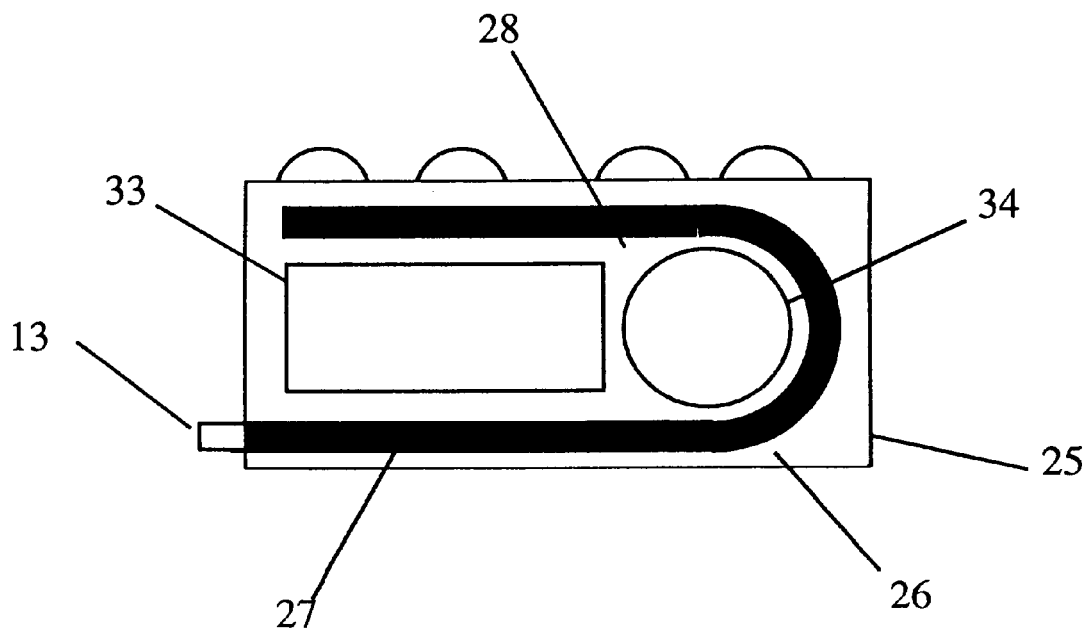
FIG. 9 shows a cross-sectional view of a mobile phone according to a second embodiment of the present invention.

FIG. 9 shows an alternative embodiment of the present invention in which the phone housing 25 is rectangular in cross-section. A generally U-shaped compartment 26 is provided within the housing 25 for storing the display 27. The battery 30 and other electrical components 31 are contained in a central compartment 28 of the housing 25. The display 27 is arranged to be spring mounted within the housing 25 so that it can be retracted thereinto when not in use.

It will be appreciated by the skilled person that modifications may be made to the embodiments described above without departing from the scope of the invention. For example, the flexible LCD display may be replaced with a simple display comprising a sheet of electroluminescent (EL) plastics material having an opaque backing sheet attached thereto. Alphanumeric characters are printed on the front of the EL sheet and the display is electrically divided into segments so that each segment can be individually illuminated to highlight the characters printed on the segment. Such a display may be sufficient for indicating, for example, the operating mode of the telephone, e.g. incoming call received, calling, stand-by etc. Alternatively a flexible display making use of electronically addressable ink material may be used. Such a display is described for example in "Electrophoretic Ink: A Printable Display Material", B. Comiskey, J. D. Albert, J. Jacobson, Society for Information Display, May 1997 Digest, pp. 75–76, (ISSN0097-0966X/97/2801-0075).

What is claimed is:

1. A mobile communication device comprising an electronic display that is itself bendable and a housing for said display, wherein said bendable display is movable between a retracted position within the housing, said display being bent during movement into said retracted position to fit within said housing, and an in-use position where said flexible display is visible to a user.

2. A device according to claim 1, said bendable electronic display comprising a bendable liquid crystal display.

3. A device according to claim 1 further comprising a spring mounting coupling said bendable display to the housing, wherein said bendable display can be withdrawn from the housing against the action of said housing under the action of said mounting.

4. A device according to claim 3, wherein said mounting comprises locking means for locking said bendable display in the in-use position and associated release means.

5. A device according to claim 3, said mounting comprising switch means for electrically activating said bendable display when it is withdrawn from said housing.

6. A device according to claim 1, wherein said bendable display is divided, in the direction of withdrawal, into a number of segments each of which is independently powered.

7. A device according to claim 6, wherein said mounting for said bendable display is arranged so that said bendable display can be withdrawn segment by segment so that only those segments which the user requires to see are visible and powered.

8. A device according to claim 1, wherein said bendable display has one or more touch-sensitive electronic elements which are accessible to the user when said bendable display is withdrawn.

9. A device according to claim 8, wherein said bendable display comprises row driver lines extending along edge regions of said bendable display in the direction of withdrawal of said display, these edge regions comprising non-active display areas, touch-sensitive elements being provided at these edge regions together with associated permanent icons.

10. A device according to claim 1, wherein said housing comprises a first compartment for containing said retracted bendable display and a second compartment within said first compartment for containing electrical components, wherein said components are substantially surrounded by said retracted bendable display.

11. A device according to claim 10, wherein said housing is substantially cylindrical and said first compartment is a substantially annular space defined by the inner surface of said housing and said electrical components.

12. A device according to claim 1, wherein said housing has a transparent window provided therein through which an active portion of said bendable display may be viewed.

13. A device according to claim 1, said device being a mobile telephone, and comprising switch means arranged to be activated when said bendable display is withdrawn from said housing to act as on 'off-hook' switch for said telephone.

14. A device according to claim 1, wherein said housing is cylindrical in shape and said bendable display is rolled into said cylindrical shape to fit within said housing.

15. A device according to claim 1, wherein said housing is u-shaped and said bendable display is folded into said u-shape to fit within said housing.

16. A mobile telephone comprising an electronic display that is bendable and a housing for containing said display, said bendable display being moveable between a retracted position, said display being bent during movement into said retracted position to fit within said housing, to an in use position where said bendable display is visible to a user, the telephone further comprising switch means actuatable by movement of said bendable display from the retracted position to the in-use position upon receipt of a telephone call to take the telephone off-hook.

* * * * *